US012786889B2

(12) United States Patent
Tsai et al.

(10) Patent No.: US 12,786,889 B2
(45) Date of Patent: Nov. 3, 2026

(54) POWER CONTROL FOR REPEATERS AND MULTI-PATH COMMUNICATION

(71) Applicant: MEDIATEK INC., Hsinchu City (TW)

(72) Inventors: Lung-Sheng Tsai, Hsinchu City (TW); Chia-Hao Yu, Hsinchu City (TW); Chun-Hao Fang, Hsinchu City (TW); Kuan-Yuan Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 248 days.

(21) Appl. No.: 18/724,371

(22) PCT Filed: May 9, 2023

(86) PCT No.: PCT/CN2023/092883
§ 371 (c)(1),
(2) Date: Jun. 26, 2024

(87) PCT Pub. No.: WO2023/221807
PCT Pub. Date: Nov. 23, 2023

(65) Prior Publication Data

US 2025/0097850 A1 Mar. 20, 2025

Related U.S. Application Data

(60) Provisional application No. 63/342,179, filed on May 16, 2022.

(51) Int. Cl.
*H04W 52/14* (2009.01)
*H04W 52/36* (2009.01)
*H04W 52/46* (2009.01)

(52) U.S. Cl.
CPC ....... *H04W 52/146* (2013.01); *H04W 52/365* (2013.01); *H04W 52/46* (2013.01)

(58) Field of Classification Search
CPC . H04W 52/146; H04W 52/365; H04W 52/46; H04W 52/08; H04W 52/242
See application file for complete search history.

(56) References Cited

U.S. PATENT DOCUMENTS 10,602,456 B2 3/2020 Li
11,228,360 B2 * 1/2022 Patel ..................... H04W 52/46
(Continued)

FOREIGN PATENT DOCUMENTS

CN 101527586 A 9/2009
EP 2790445 A1 * 10/2014 ............ H04W 64/00
(Continued)

OTHER PUBLICATIONS

International Search Report and Written Opinion dated Oct. 16, 2023, issued in application No. PCT/CN2023/092883.
(Continued)

*Primary Examiner* — Lewis G West
(74) *Attorney, Agent, or Firm* — McClure, Qualey & Rodack, LLP

(57) ABSTRACT

A method of power control can include receiving at a UE a first downlink reference signal from a repeater and a second downlink reference signal from a base station, the first downlink reference signal corresponding to a first path that is between the UE and the base station and passes the repeater, the second downlink reference signal corresponding to a second path that is between the UE and the base station. The UE estimates a first uplink path loss of the first path and a second uplink path loss of the second path and determine a first uplink transmit power corresponding to the first path and a second uplink transmit power corresponding to the second path. The UE performs an uplink transmission
(Continued)

on the first path based on the first uplink transmit power and on the second path based on the second uplink transmit power.

7 Claims, 4 Drawing Sheets

(56) References Cited

U.S. PATENT DOCUMENTS

| | | | | |
|---|---|---|---|---|
| 12,004,092 | B2 * | 6/2024 | Abedini | H04B 1/005 |
| 12,610,322 | B2 * | 4/2026 | Chen | H04W 52/146 |
| 2013/0077502 | A1 * | 3/2013 | Gainey | H04B 7/15578 370/252 |
| 2020/0107272 | A1 | 4/2020 | He | |
| 2021/0126701 | A1 | 4/2021 | Patel | |
| 2021/0306962 | A1 | 9/2021 | Abedini | |
| 2021/0409106 | A1 * | 12/2021 | Ashworth | H04B 7/15535 |
| 2022/0109493 | A1 * | 4/2022 | Ashworth | H04B 7/15535 |
| 2024/0072883 | A1 * | 2/2024 | Lee | H04W 52/46 |
| 2024/0072987 | A1 * | 2/2024 | Tsai | H04L 5/14 |
| 2024/0244534 | A1 * | 7/2024 | Chen | H04W 52/146 |
| 2026/0113076 | A1 * | 4/2026 | Furuichi | H04B 7/04013 |

FOREIGN PATENT DOCUMENTS

| | | | |
|---|---|---|---|
| JP | 2011182002 | A | 9/2011 |
| WO | 2013065426 | A1 | 5/2013 |
| WO | 2021041113 | A1 | 3/2021 |

OTHER PUBLICATIONS

Partial Supplementary European Search Report dated Jan. 29, 2026, issued in application No. EP 23806759.9.

Nokia, et al.; "UL Power Control for MIMO;" 3GPP TSG RAN WG1 Meeting #89; May 2017; pp. 1-6.

* cited by examiner

POWER CONTROL FOR REPEATERS AND MULTI-PATH COMMUNICATION

INCORPORATION BY REFERENCE

This present application claims the benefit of U.S. Provisional Application No. 63/342,179, "Power control for repeaters and multi-path communication", filed on May 16, 2022, which is incorporated herein by reference in its entirety.

TECHNICAL FIELD

The present disclosure relates to power control in wireless communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Power control mechanisms can be used to ensure that uplink or downlink transmit power is at a suitable level such that the transmission can be received with sufficient power to allow for proper demodulation of the corresponding information. At the same time, the transmission does not cause unnecessary interference to other transmissions in the same or other cells.

SUMMARY

Aspects of the disclosure provide a method of power control. The process can include receiving, at a user equipment (UE), a first downlink reference signal from a repeater and a second downlink reference signal from a base station, the first downlink reference signal corresponding to a first path that is between the UE and the base station and passes the repeater, the second downlink reference signal corresponding to a second path that is between the UE and the base station; estimating a first uplink path loss of the first path that is between the UE and the base station and passes the repeater based on a measurement of the first downlink reference signal; estimating a second uplink path loss of the second path that is between the UE and the base station based on a second downlink measurement of the second downlink reference signal; determining a first uplink transmit power corresponding to the first path that is between the UE and the base station and passes the repeater based on the first uplink path loss; determining a second uplink transmit power corresponding to the second path that is between the UE and the base station based on the second uplink path loss; and performing an uplink transmission on the first path that is between the UE and the base station and passes the repeater based on the first uplink transmit power and on the second path that is between the UE and the base station based on the second uplink transmit power.

In an embodiment, the first downlink reference signal from the repeater and the second downlink reference signal from the base station correspond to a same set of downlink reference signal resources configured to the UE from the base station.

In an embodiment, the method can further include transmitting a first uplink reference signal through the first path that is between the UE and the base station and passes the repeater and a second uplink reference signal through the second path that is between the UE and the base station; and receiving a first transmit power control (TPC) command for adjusting transmit power of the first path that is between the UE and the base station and passes the repeater, the first TPC command corresponding to the first uplink reference signal, and a second TPC command corresponding to the second path that is between the UE and the base station, the second TPC command corresponding to the second uplink reference signal. The first uplink transmit power corresponding to the first path that is between the UE and the base station and passes the repeater is determined based on the first uplink path loss and the first TPC command, and the second uplink transmit power corresponding to the second path that is between the UE and the base station is determined based on the second uplink path loss and the second TPC command.

In an embodiment, the first uplink reference signal and the second uplink reference signal are transmitted using a set of uplink reference signal resources corresponding to a set of multiple antenna ports configured to the UE, the uplink reference signal resources for transmitting the first uplink reference signal corresponding to a first set of antenna ports from the set of multiple antenna ports, the uplink reference signal resources for transmitting the second uplink reference signal corresponding to a second set of antenna ports from the set of multiple antenna ports. In an example, the first uplink reference signal and the second uplink reference signal are transmitted using different sets of uplink reference signal resources configured to the UE.

In an embodiment, the first path consisting of a first-hop path between the repeater and the UE on a first frequency band and a second-hop path between the base-station and the repeater on a second frequency band, and the second path that is between the UE and the base station is on the second frequency band, wherein the second frequency band is different from the first frequency band.

In an embodiment, the method can further comprises determining first power headroom information corresponding to the first path that is between the UE and the base station and passes the repeater; determining second power headroom information corresponding to the second path that is between the UE and the base station, and reporting at least one of the first power headroom information, the second power headroom information, and a power headroom information derived from both the first power headroom information and the second power headroom information, to the base station.

Aspects of the disclosure provide another method of power control. The process can include receiving, at a repeater from a base station, a first indication of adjusting an uplink maximum transmit power of the repeater; adjusting the uplink maximum transmit power to a first level according to the first indication of adjusting the uplink maximum transmit power of the repeater; and amplifying a first uplink signal received from a UE and forwarding the amplified first uplink signal to the base station. The adjusted uplink maximum transmit power of the first level is applied for amplifying the first uplink signal received from the UE such that instantaneous transmit power of the amplified first uplink signal received from the UE is not above the adjusted uplink maximum transmit power of the first level.

In an embodiment, the process can further include receiving, at the repeater from the base station, a second indication of adjusting a downlink maximum transmit power of the repeater; adjusting the downlink maximum transmit power to a second level according to the second indication of adjusting the downlink maximum transmit power of the repeater; and amplifying a first downlink signal received from the base station and forwarding the amplified first downlink signal to the UE. The adjusted downlink maximum transmit power of the second level is applied for amplifying the first downlink signal received from the base station such that instantaneous transmit power of the amplified first downlink signal received from the base station is not above the adjusted downlink maximum transmit power of the second level.

In an embodiment, the method can further include receiving, at the repeater from the base station, a third indication of adjusting both a downlink maximum transmit power and the uplink maximum transmit power of the repeater, the third indication indicating a same or different transmit power backoffs for the downlink maximum transmit power and the uplink maximum transmit power of the repeater.

In an embodiment, the method can further include receiving, at the repeater from the UE, a fourth indication of adjusting the uplink maximum transmit power of the repeater; adjusting the uplink maximum transmit power to a third level according to the fourth indication of adjusting the uplink maximum transmit power of the repeater; and amplifying a second uplink signal received from the UE and forwarding the amplified second uplink signal received from the UE to the base station. The adjusted uplink maximum transmit power of the third level is applied for amplifying the second uplink signal received from the UE such that instantaneous transmit power of the amplified second uplink signal received from the UE is not above the adjusted uplink maximum transmit power of the third level.

In an example, the method can further include receiving, at the repeater from the UE, a fifth indication of adjusting a downlink maximum transmit power of the repeater; adjusting the downlink maximum transmit power to a fourth level according to the fifth indication of adjusting the downlink maximum transmit power of the repeater; and amplifying a second downlink signal received from the base station and forwarding the amplified second downlink signal to the UE. The adjusted downlink maximum transmit power of the fourth level is applied for amplifying the second downlink signal received from the base station such that instantaneous transmit power of the second amplified downlink signal received from the base station is not above the adjusted downlink maximum transmit power of the fourth level.

In an embodiment, the method can further include receiving, at the repeater from the UE, a sixth indication of adjusting both a downlink maximum transmit power and the uplink maximum transmit power of the repeater, the sixth indication indicating a same or different transmit power backoffs for the downlink maximum transmit power and the uplink maximum transmit power of the repeater.

In an embodiment, the method can further include transmitting a power headroom report (PHR) from the repeater to one of the base station and the UE, the PHR corresponding to one of an uplink between the repeater and the base station and a downlink between the repeater and the UE. In an embodiment, the method further includes reporting, from the repeater to one of the base station and the UE, an indication of whether a current transmit power of the repeater has reached a maximum transmit power limitation, the current transmit power corresponding to one of an uplink between the repeater and the base station and a downlink between the repeater and the UE.

In an embodiment, the method further includes reporting, from the repeater to one of the base station and the UE, an indication of whether a current transmit power of the repeater has reached a preconfigured transmit power limitation threshold, the current transmit power corresponding to one of an uplink between the repeater and the base station and a downlink between the repeater and the UE.

In an embodiment, the method further includes reporting, from the repeater to one of the base station and the UE, an indication of a current amplifying gain margin compared with a maximum allowable amplifying gain, the current amplifying gain margin corresponding to one of an uplink between the repeater and the base station and a downlink between the repeater and the UE.

Aspects of the disclosure can further provide a repeater in a relay system. The repeater can include circuitry configured to receive, at the repeater from a base station, a first indication of adjusting an uplink maximum transmit power of the repeater; adjust the uplink maximum transmit power to a first level according to the first indication of adjusting the uplink maximum transmit power of the repeater; and amplify a first uplink signal received from a user equipment (UE) and forward the amplified first uplink signal to the base station. The adjusted uplink maximum transmit power of the first level is applied for amplifying the first uplink signal received from the UE such that instantaneous transmit power of the amplified first uplink signal received from the UE is not above the adjusted uplink maximum transmit power of the first level.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

I. Wireless Relay Systems with Repeaters

Figure 2:
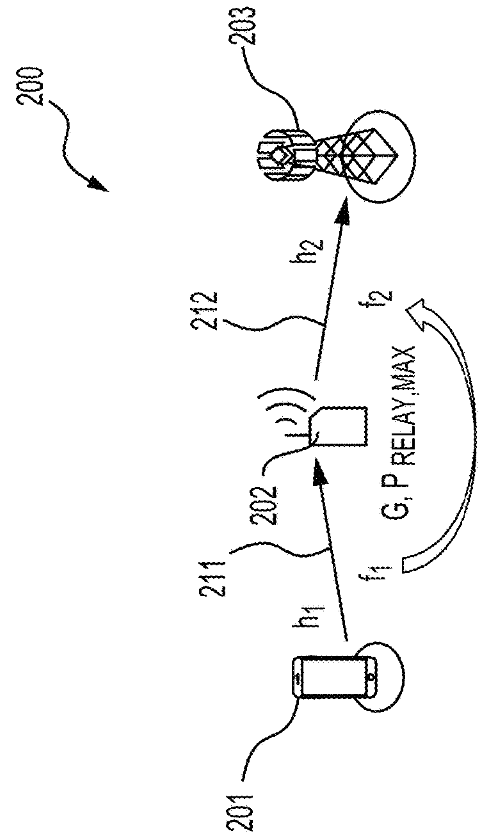
FIGS. 1-3 show three wireless relay systems 100/200/300 according to embodiments of the disclosure.
Figure 1:
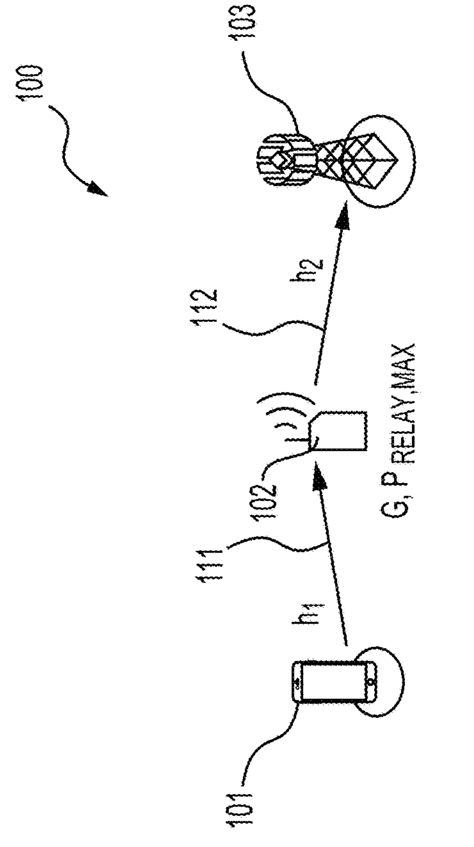
Figure 3:
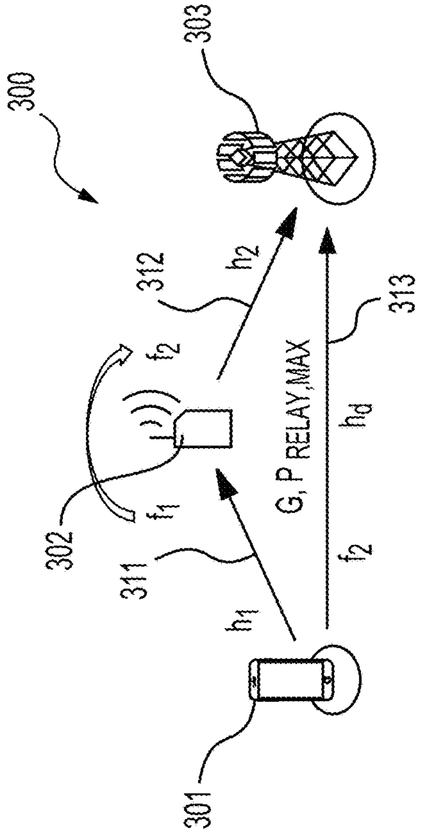

FIGS. 1-3 show three wireless relay systems 100/200/300 according to embodiments of the disclosure. The system 100 can include a user equipment (UE) 101, a repeater 102, and a base station 103. The system 200 can include a UE 201, a repeater 202, and a base station 203. The system 300 can include a UE 301, a repeater 302, and a base station 303.

The three systems 100/200/300 employ the repeaters (or referred to as relays) 102/202/302 to extend network coverage. For example, mobile operators can rely on the deployment of regular full-stack cells to provide network coverage. However, this option may not always be possible (e.g., no availability of backhaul) or economically viable. As a result, repeaters can be used to increase mobile operators' flexibility for their network deployments. In other examples, a mobile service user may install a repeater to increase network coverage. Such a repeater may not be under the control of a mobile operator.

In FIGS. 1-3, the UEs 101/201/301 can each be a mobile phone, a laptop computer, a communication device carried in a vehicle, and the like. The base stations 103/203/303 can be a node of cellular network managed by a mobile operator or a node of a computer network. The repeaters 102/202/302 can employ an amplify-and-forward scheme to relay their input signals. The repeaters 102/202/302 can operate in full-duplex with a fixed or variable amplify (or amplifying) gain (denoted as G). The repeaters 102/202/302 can have a maximum power constraint for relay (denoted $P_{relay,\ max}$). The repeaters 102/202/302 can each be controlled by a base station, such as in a scenario where a mobile operator deploys the repeater. Or, the repeaters 102/202/302 can each be controlled by a UE, such as in a scenario where a UE user deploys a repeater. In some examples, the repeaters 102/202/302 can be under the control of both a UE and a base station.

In the FIG. 1 example, a first uplink 111 from the UE 101 to the repeater 102 and a second uplink 112 from the repeater 102 to the base station 103 form one uplink path. Communication channels corresponding to the two links 111-112 are denoted as h1 and h2, respectively. In the present disclosure, the direction towards a base station and leaving a UE is referred to as uplink direction. The direction leaving a base station and towards a UE is referred to as a downlink direction. The link 111 may operate in a same frequency band as the link 112 connecting the base station 103. Accordingly, the repeater 102 can be called an in-band repeater.

In the FIG. 2 example, a first uplink 211 from the UE 201 to the repeater 202 and a second uplink 212 from the repeater 202 to the base station 203 form one uplink path. Communication channels corresponding to the two links 211-212 are denoted as h1 and h2, respectively. The link 211 may operate in a frequency band (denoted f1) different than a frequency band (denoted f2) of the link 212. Accordingly, the repeater 202 can be called a frequency-translation repeater. In some examples, the frequency band f2 can be in a lower frequency range, such as the sub-6 GHz spectrum. The frequency band f1 can be in a higher frequency range, such as the millimeter wave spectrum. In other examples, the frequency band f1 may have a higher frequency than the frequency band f2.

In the FIG. 3 example, the UE 301 communicates with the base station 303 via two paths: a direct path and an indirect path. The direct path corresponds to an uplink 313. The indirect path corresponds to uplinks 311-312. The uplink 311 provides a communication channel h1 between the UE 301 and the repeater 302. The uplink 311 operates on a frequency band f1. The uplink 312 provides a communication channel h2 between the repeater 302 and the base station 303. The uplink 312 operates on a frequency band f2. The repeater 302 operates as a frequency-translation repeater.

II. Power Control for Transparent Relay

In some cases, the repeaters (102/202/302) can function in a transparent manner, allowing the UEs and base stations to operate as if the repeaters do not exist. However, this may lead to imbalanced receive power of different paths at the UE 301 or the base station 303, which can reduce diversity/multiplexing gain at the receiver, when using multi-antenna transmission techniques. To address this issue and achieve balanced receive power, separate power control for the direct path and the indirect path is desirable.

Furthermore, in a transparent relay scenario, the base station may inadequately perform resource scheduling or issue transmit power control (TPC) commands. For instance, multiple UEs may share a repeater and cause it to operate at its maximum transmit power in uplink transmission. Without knowledge of the repeater's output power status, the base station may continue to command a UE to increase transmit power, leading to unnecessary UE power consumption. Alternatively, the base station may control the UE to increase its modulation and coding scheme (MCS) level, which could result in decoding failure at the base station. To avoid these issues, repeater power headroom reports (PHRs) are desirable.

Moreover, it is desirable to be able to adjust the repeater transmit power in both the uplink and downlink directions from either the UE or the base station. For example, the base station can adjust uplink repeater transmit power to adapt to the noise and interference level near the base station. For example, the UE can adjust uplink repeater transmit power of a user-controlled repeater in response to a TPC command, thereby saving UE power.

The present disclosure provides several techniques to enable these desired technological advantages.

III. Power Control with a Single Path Having Two Hops

1. Single Two-Hop Path with In-Band Repeater

In the FIG. 1 example, the UE 101 communicates with the base station 103 in uplink via a single two-hop path with the in-band repeater 102. In such a scenario, open-loop power control and closed-loop power control can be performed to control the transmit power of the UE 101.

For example, in open-loop control, the UE 101 may measure a downlink path loss based on downlink reference signals transmitted from the base station 103. The downlink reference signals can have been amplified by the repeater 102 when arriving at the UE 101. Based on the measurement result, the UE 101 can determine a suitable transmit power to compensate the respective downlink path loss.

For example, in closed-loop control, the UE 101 can transmit uplink reference signals, such as uplink sounding reference signals (SRSs). The base station 103 measures the uplink SRSs to determine a signal to interference and noise ratio (SINR). The uplink SRSs can have been amplified by the repeater 102. The base station accordingly sees the received SRSs with a composite effect of the two channels (h1 and h2) and the repeater gain (G). The composite effect can be represented by the following expression:

$$h2 * \min\{sqrt(G) * h1,\ P_{relay,max}\, h1/|h1|\}.$$

Based on the measurement results, the base station can command the UE 101 to increase or decrease the UE transmit power. Two options are available in some embodiments.

In a first option, the base station 103 can signal a TPC command (or an instruction in any other forms) to the UE 101, instructing the UE 101 to adjust the transmit power. In a second option, the base station 103 can signal an instruction to the repeater to adjust the transmit power.

2. Single Two-Hop Path with Frequency-Translation Repeater

In the FIG. 2 example, the UE 201 communicates with the base station 203 in uplink via a single two-hop path with the frequency-translation repeater 202. In such a scenario, open-loop power control and closed-loop power control can be performed to control the transmit power of the UE 201, similarly to the scenario with in-band repeater described above. The difference between the two scenarios is that the repeater 202 performs frequency translation of the received signal while the repeater 102 uses the same frequency for input and output. For example, for downlink reference signals, they are converted from frequency band f2 to frequency band f1 during the transmission. For uplink reference signals, they are converted from frequency band f1 to frequency band f2 during the transmission.

IV. Power Control of Multi-Path Scenario

In a multi-path scenario, such as the FIG. 3 example, coherent transmission and reception can be assumed along the multiple paths (in a downlink or uplink direction). For example, suitable multi-antenna transmission precoder can be employed to maintain coherent transmission and reception between the indirect path and the direct path. To obtain the benefit of diversity/multiplexing gain of multi-path transmission, sperate power control on individual direct path and indirect path can be performed to balance instantaneous channel gains in some embodiments. In various embodiments, the direct path and the hops of the indirect path can be multiplexed in various ways, such as frequency-division multiplex (FDM), time-division multiplex (TDM), special-division multiplex (SDP), and the like.

Uplink Reference Signals to Support Uplink Power Control

In the multi-path scenario in FIG. 3, the direct path operates on frequency band f2, and the uplink 311 of the indirect path operates on frequency band f1 for the first hop between the UE and repeater and operates on frequency band f2 for the second hop between the repeater and base station. For such a multi-path scenario, in some embodiments, two groups of uplink sounding reference signal (SRS) resources can be used for received-power measurement at the base station 303. A first group of SRS resources correspond to the indirect path (corresponding to the uplinks 311-312). A second group of SRS resources correspond to the direct path (corresponding to the uplink 313). The two groups of SRS resources can be orthogonal to each other (for example, by way of code-division multiplex (CDM), FDM, TDM, phase rotation, or the like). The base station 303 can thus distinguish the two groups of SRSs and accordingly measure receive power separately for the two paths.

There can be two options for organizing the two groups of SRS resources. In a first option, the two groups of SRS resources can belong to a same set of SRS resources corresponding to a set of multiple antenna ports configured from the base station 303. In an example, the same set of SRS resources can be a multi-port SRS. For example, the UE 301 supports 4 antenna port. The different antenna ports share the same set of resource elements in a radio resource grid and the same SRS sequence. Different sequence phase rotations are applied to the respective SRS sequences for different antenna ports. The first two ports of the SRSs can be transmitted on the indirect path, firstly over the frequency band f1 and then over the frequency band f2. The other two ports of the SRSs can be transmitted on the direct path over the frequency band f2. From the perspective of the base station 303, the received SRSs of the two paths on the frequency band f2 match the configured SRS resource pattern of the 4-port SRS.

In a second option, the two groups of SRS resources can belong to two sets of SRS resources configured from the base station 303 to the UE 301. The two sets of SRS resources can be orthogonal to each other, so that the base station 303 can distinguish the respective SRS for different paths.

Based on the configured two groups of SRS resources, two closed-loop power control can be performed corresponding to each of the direct or indirect path. For example, based on measurements of the two groups of SRS resources, the base station 303 can provide instructions to individually adjust UE transmit power for the direct and indirect paths. In an example, the base station 303 may transmit two TPC commands to the UE 301: one for the UE transmit power on the direct path and one for the UE transmit power on the indirect path. Alternatively, the base station 303 may transmit one TCP commands to the UE 301 having two different power adjustment values.

For downlink path loss measurement, in some embodiments, the UE 301 can separately measure the path losses for the direct path and indirect path. For example, a same or different sets of downlink reference signals (or resources) can be used in downlink transmission for the downlink path loss measurement. The direct downlink path between the UE 301 and the base station 303 and the downlink between the UE 301 and the repeater 301 can operate on different frequency bands (FDM). The UE 301 can accordingly distinguish the downlink reference signals received from these two paths. In combination with other power control parameters (partial compensation coefficient, resource block numbers, or the like), open-loop or closed-loop power control can be implemented.

V. Power Headroom Report

In the relay systems 100-300, a UE can be configured to report power headroom to a base station, for example, by medium access control (MAC) control element (CE) signaling. A scheduler at the base station can make resource scheduling decision or power control decision based on a power headroom report (PHR). For example, a suitable data rate can be determined such that the UE can have enough power headroom to support the data rate.

The power headroom refers to the amount of transmit power available at the UE. The power headroom can be a difference between a UE nominal transmit power level (such as a maximum transmit power per component carrier) and a power used in a reference transmission. The reference transmission can be an actual transmission or a hypothetical transmission. For example, a transmit power needed for a reference transmission can be determined based on a measured downlink path loss, a scheduled resource size, MCS, a TPC value, and other parameters. The calculated transmit power may be above the UE's maximum transmit power, resulting in a negative power headroom value.

In some examples, there can be three types of PHR. Type 1 PHR can report the difference between the nominal UE maximum transmit power and the estimated power for UL-SCH transmission per activated serving cell (per component carrier). Type 2 PHR can report the difference between the nominal UE maximum transmit power and the estimated power for UL-SCH and PUCCH transmission on a secondary primary cell (SpCell) of a MAC entity (i.e. E-UTRA MAC entity in EN-DC, NE-DC, and NGEN-DC cases). Type 3 PHR can report the difference between the nominal UE maximum transmit power and the estimated power for SRS transmission per activated serving cell.

For example, a PHR can be triggered for the following reasons: periodic reporting as controlled by a timer, change in path loss (when the difference between the current power headroom and the last report is larger than a configurable threshold), and other reasons.

1. Multi-path UE Power Headroom Report

In the multi-path relay scenario of the FIG. 3 example, the UE 301 can transmit a PHR that including power headroom information for more than 1 path in an activated serving cell. For example, the PHR can include power headroom information for a direct path and power headroom information for an indirect path. In some cases, multiple repeaters are employed. Accordingly, there can be multiple indirect paths corresponding to the multiple repeaters. In such a scenario, the PHR can include power headroom information for one or more indirect paths in addition to headroom information for a direct path. In some examples, the PHR can include power headroom information for one or more indirect paths only. No power headroom information for the direct path is included or reported. In various cases, the power headroom information for the indirect path can have considered the amplify effect of the employed repeater.

In addition, in some embodiments, the multi-path PHR can include identifiers for respective paths. The power headroom information corresponding to a path can be associated with the path identifier. (Such path identifier can be referred to as a power headroom information identifier.) The path identifier can help the base station 303 to associate the power headroom information with the respective path. For example, the path identifier can be associated with or derived based on a respective component carrier identifier (serving sell identifier). Or, the path identifier can be associated with or indicated by an identifier used to distinguish the sounding reference signal resources utilized by respective paths. For example, the sounding reference signal resources are used on respective paths to measure downlink path loss or uplink receipt power at a base station. For example, these sounding reference resources for each path may have a resource index as an identifier.

In some examples, the power headroom information for respective paths can be derived and included in the PHR. For deriving a per-path power headroom information of a specific path, a respective path-specific UE nominal transmit power level (maximum transmit power) and a path-specific transmit power level of a reference transmission can be used. For example, for the indirect and direct uplink paths in FIG. 3, the base station 303 can configure a maximum transmit power for each path to the UE 301.

For example, as described above, the UE 301 can measure downlink path loss based on downlink reference signals transmitted over each path. The UE 301 may further receive TPC values for each path from the base station 303. The UE 301 may receive other parameters configured from the base station 303, such as partial path loss compensation coefficient, and expected receive power level at the base station 303. The UE 301 may receive resource assignment information from the base station 303, which indicate a resource size and MCS for an uplink transmission. Based on the information and parameters received, the UE 301 can determine a reference transmission power for each path.

In some examples, the power headroom information for different paths may be indicated by one common power headroom value instead of by separate power headroom values. For deriving such a common power headroom value, in some examples, one common UE nominal transmit power level may be configured by the base station 303 and used at the UE 301. The transmit power for reference transmissions of different paths can be derived separately and summed together for deriving the common power headroom value. In an embodiment, such power headroom report with one common power headroom value is used in the scenario where an in-band repeater is used. In some examples, the UE can report to the base station at least one of a first power headroom information corresponding to an indirect path, a second power headroom information corresponding to a direct path, and a power headroom information derived from both the first power headroom information and the second power headroom information.

2. Repeater Power Headroom Report

In some examples, a repeater can transmit a PHR report indicating a power headroom for a downlink direction, a power headroom for an uplink direction, or two power headrooms for both directions. In different examples, the PHR report can be send to a UE, a base station, or both in a relay stem, such as in the examples of FIGS. 1-3. In this way, the base station or the UE can have the power headroom information available for making various decisions.

In some examples, a repeater can function in an amplify-and-forward manner. Noises, interferences, or other dirty signals would be amplified indiscriminately. Accordingly, instantaneous output power of the repeater may differ from the intended PHR value significantly and frequently. The PHR based on the instantaneous output cannot reflect the repeater transmit power accurately. Considering such a scenario, in some examples, in place of or in addition to the PHR, a repeater can transmit an indication of whether the repeater has reached a maximum transmit power limitation for a downlink direction, an uplink direction, or both directions. Similarly, such an indication of maximum transmit power status can be send to a UE, a base station, or both.

In some examples, for uplink PHR or maximum power status indication report, the repeater can be treated as a UE. For example, the repeater can similarly estimate an uplink transmit power based on a downlink path loss measurement and, additionally, other factors or parameters. The uplink PHR or whether having reached the maximum transmit power can further be determined based on a difference between the maximum transmit power and the estimated uplink transmit power.

In some examples, the PHR or maximum power status indication for uplink and/or downlink directions can be sent to a terminal node first. The terminal node may further relay or report the PHR or indication to a network node. In some examples, such a method can be used in a scenario where there is not signaling between the repeater and the base station.

In some examples, the PHR or maximum power status indication for uplink and/or downlink directions can be signaled to the UE or the base station periodically. Or, a report of the PHR or indication can be triggered when the repeater reaches the maximum transmit power in the downlink and/or uplink direction. In some cases, the different reporting pattern or arrangement are configurable and switchable.

In some examples, the PHR or maximum power status indication can be transmitted when certain conditions are met, not necessarily reaching the maximum transmission power. In an example, the condition can be the transmit power (uplink or downlink direction) reaching a predefined threshold. There can be multiple predefined transmit power limitation thresholds corresponding to different levels of transmit power. In an example, the condition can be the receive power reaching a predefined threshold. The definition of the transmit power or receive power depends on the repeater's transmission direction but not necessarily linked to a specific air interface.

In some examples, a repeater may report an amplify (amplifying) gain margin(s) for downlink direction, uplink direction, or both to a UE or a base station. For example, the amplify gain margin can be a difference between a current amplify gain and a maximum allowable amplify gain of the repeater. Such a amplify gain margin report can be in addition to or in place of a PHR and/or a maximum power status indication.

Based on the received power information (the PHR, the maximum power status indication, and/or the amplify gain margin report), a UE or a base station can accordingly make adequate power control decisions. For example, a repeater can be dedicated to one user or shared by multiple users. It is possible that the repeater has reached the repeater's maximum transmit power and the UE has not reached the UE's maximum power. The network (e.g., a base station) may not know such situation assuming there is no power information report from the repeater. The network may accordingly instruct the UE to keep increasing the UE's transmit power, wasting UE power. When the repeater's power status is available at the network side, the network can be aware of whether increasing the UE's transmit power is valid or not.

In some examples, with the knowledge of power status of the repeater, the network can command the repeater to increase transmit power to mitigate high noise and interference level at the base station, saving power of UEs sharing the repeater. In some examples, with the knowledge of power status of the repeater, the UE can control the repeater (e.g., a UE controlled repeater) to increase transmit power in response to receiving a TPC command from the network. The TPC command requests the UE to increase transmit power.

VI. Repeater Maximum Transmit Power Control

In some examples, a network (e.g., a base station) may desire to control a repeater's transmit power to avoid creating strong co-channel inference. For example, the received power from the repeater is desired to be high enough for successful demodulation but not too high to interfere neighboring cells. One option is to adjust either amplifying gain or transmit power of the repeater, for example, by means of TPC command to increase or decrease the gain or transmit power. However, because the input power of the repeater varies and cannot be predicted by the network, it is difficult to rely on adjusting the amplifying gain or transmit power to control the received transmit power level at the network.

An alternative mechanism is to adjust the maximum transmit power of the repeater. For example, the base station can configure or set a maximum transmit power level for the repeater. This maximum transmit power level serves as a cap transmit power to limit the instantaneous transmit power of the repeater. This is a more effective and easier way to control received power level at the base station. For example, if the instantaneous transmit power is less than or equal to the set maximum transmit power, the repeater can transmit without changing the transmit power. Otherwise, the repeater can apply the set maximum transmit power to restrict the transmit power.

In various embodiments, either the network (base station) or a particular node (e.g., a UE) can control or apply the repeater maximum transmit power adjustment (to increase or decrease). Also, the repeater maximum transmit power control can be applied to downlink direction, uplink direction, or both directions. For example, a base station or a UE may set a repeater's downlink maximum transmit power to control a coverage of the repeater and to limit the repeater's interference to neighboring repeaters or UEs.

In some examples, the adjustment of one or more repeaters' maximum transmit power can be communicated from a UE or a base station via radio resource control (RRC) messages, MAC-CE, downlink control information, uplink control information, and the like. In some examples, the repeater maximum transmit power adjustment can be specific or common to transmission directions. In one example, the repeater maximum transmit power adjustment can be independent or different for downlink, uplink, or local links. For example, a local link can be between a repeater (e.g., a watch serving as a repeater) and a downstream node (UE). In one example, the maximum transmit power (or adjustment) can be common for downlink and uplink. In one example, the repeater maximum transmit power can be additionally common or different for local links.

In some examples, the repeater maximum transmit power adjustment of one or a group of repeater node's maximum transmit power may be via maximum power reduction (MPR) similar to that for UE via MPR. The repeater maximum transmit power increase or decrease can correspond to a power backoff (or transmit power backoff) signaled from a base station or a UE. For example, a repeater may derive its maximum transmit power based on, for example, frequency band, its capability, etc. An additional power backoff can be imposed due to power management functionalities to derive a maximum configured transmit power that a repeater node respects. An additional power backoff signaled from the network (or another node such as a UE) may further reduce the maximum configured transmit power. The additional power backoff may be included with other power backoffs into a single factor, and appears as an aggregated value, such as a value of an MPR.

VII. Process Examples

Figure 4:
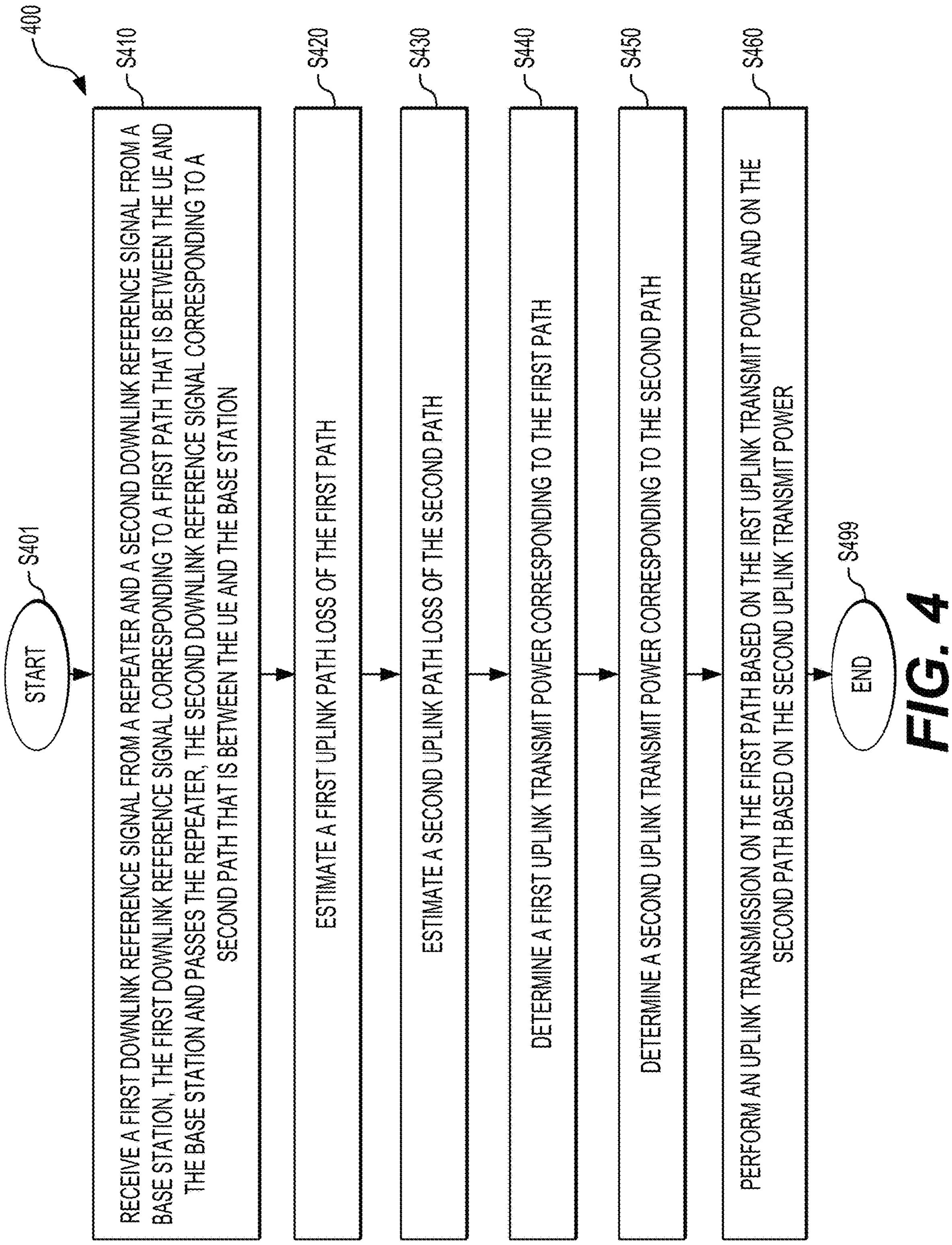
FIG. 4 shows a power-control process 400 according to embodiments of the disclosure.

FIG. 4 shows a power-control process 400 according to embodiments of the disclosure. The process 400 can start from S401 and proceed to process S410. The process 400 can be performed by a UE in a relay system.

At S410, the UE can receive a first downlink reference signal from a repeater and a second downlink reference signal from a base station. The first downlink reference signal corresponds to a first path that is between the UE and the base station and passes the repeater. The second downlink reference signal corresponds to a second path that is between the UE and the base station. In various embodiments, the first downlink reference signal and the second downlink reference signal can correspond to a same set or different sets of downlink reference signal resources configured to the UE from the base station.

At S420, a first uplink path loss of the first path can be estimated based on a measurement of the first downlink reference signal.

At S430, a second uplink path loss of the second path can be estimated based on a second downlink measurement of the second downlink reference signal.

At S440, a first uplink transmit power corresponding to the first path can be determined based on the first uplink path loss.

At S450, a second uplink transmit power corresponding to the second path can be determined based on the second uplink path loss.

At S460, an uplink transmission can be performed on the first path based on the first uplink transmit power and on the second path based on the second uplink transmit power. The process 400 can proceed to S499 and terminate at S499.

Figure 5:
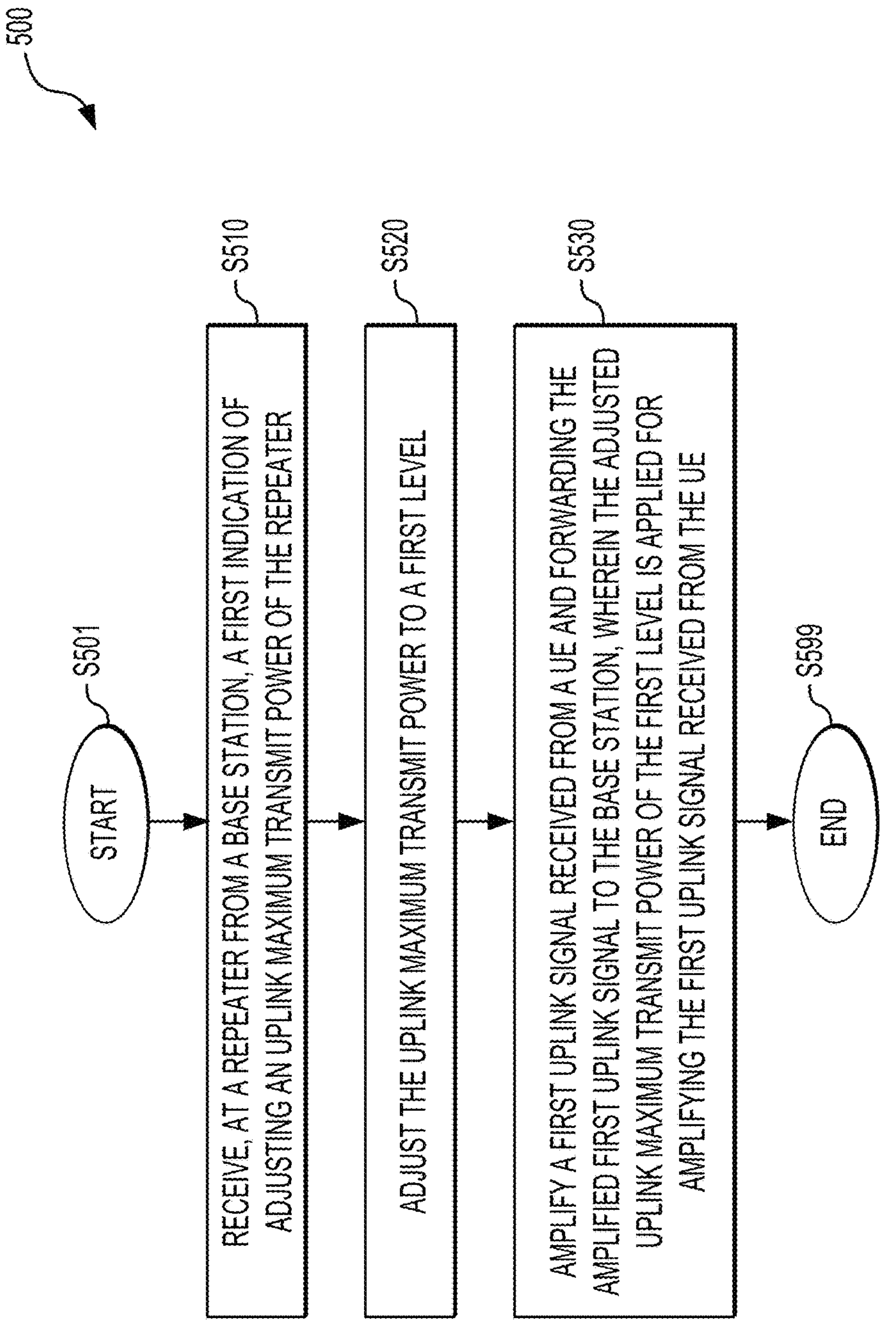
FIG. 5 shows another power control process 500 according to embodiments of the disclosure.

FIG. 5 shows another power control process 500 according to embodiments of the disclosure. The process 500 can start from S501 and proceed to S510. The process 500 can be performed by a repeater in a relay system.

At S510, a first indication of adjusting an uplink maximum transmit power of the repeater can be received at the repeater from a base station.

At S520, the uplink maximum transmit power of the repeater can be adjusted to a first level according to the first indication of adjusting the uplink maximum transmit power of the repeater.

At S530, a first uplink signal received from a UE can be amplified and forwarded to the base station. The adjusted uplink maximum transmit power of the first level is applied for amplifying the first uplink signal received from the UE. As a result, instantaneous transmit power of the amplified first uplink signal received from the UE is not above the adjusted uplink maximum transmit power of the first level. The process 500 can proceed to S599 and terminate at S599.

It is noted that, in other example, the steps of the processes 400-500 may be performed in parallel or in an order different from described above. Also, not all the steps are performed in some other examples.

VIII. Apparatus

Figure 6:
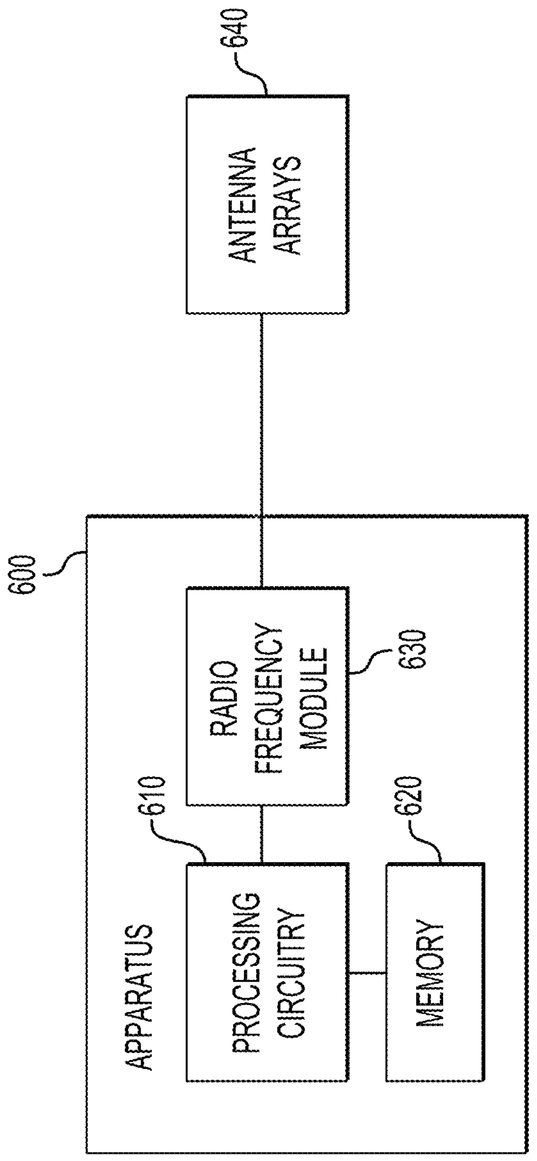
FIG. 6 shows an apparatus 600 according to embodiments of the disclosure.

FIG. 6 shows an apparatus 600 according to embodiments of the disclosure. The apparatus 600 can be configured to perform various functions in accordance with one or more embodiments or examples described herein. Thus, the apparatus 600 can provide means for implementation of mechanisms, techniques, processes, functions, components, systems described herein. For example, the apparatus 600 can be used to implement functions of UEs, repeaters, or base stations in various embodiments and examples described herein. The apparatus 600 can include a general-purpose processor or specially designed circuits to implement various functions, components, or processes described herein in various embodiments. The apparatus 600 can include processing circuitry 610, a memory 620, and a radio frequency (RF) module 630.

In various examples, the processing circuitry 610 can include circuitry configured to perform the functions and processes described herein in combination with software or without software. In various examples, the processing circuitry 610 can be a digital signal processor (DSP), an application-specific integrated circuit (ASIC), programmable logic devices (PLDs), field programmable gate arrays (FPGAs), digitally enhanced circuits, or comparable device or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory 620 can include non-transitory storage media, such as a read-only memory (ROM), a random-access memory (RAM), a flash memory, a solid-state memory, a hard disk drive, an optical disk drive, and the like.

In an embodiment, the RF module 630 receives a processed data signal from the processing circuitry 610 and converts the data signal to beamforming wireless signals that are then transmitted via antenna arrays 640, or vice versa. The RF module 630 can include a digital-to-analog converter (DAC), an analog-to-digital converter (ADC), a frequency-up-converter, a frequency-down-converter, filters and amplifiers for reception and transmission operations. The RF module 630 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 640 can include one or more antenna arrays.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer-readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random access memory (RAM), a read-only memory (ROM), a magnetic disk and an optical disk, and the like. The computer-readable non-transitory storage medium can include all types of computer-readable medium, including magnetic storage medium, optical storage medium, flash medium, and solid-state storage medium.

While aspects of the present disclosure have been described in conjunction with the specific embodiments thereof that are proposed as examples, alternatives, modifications, and variations to the examples may be made.

Accordingly, embodiments as set forth herein are intended to be illustrative and not limiting. There are changes that may be made without departing from the scope of the claims set forth below.

What is claimed is:

1. A method, comprising:

receiving, at a user equipment (UE), a first downlink reference signal from a repeater and a second downlink reference signal from a base station, the first downlink reference signal corresponding to a first path that is between the UE and the base station and passes the repeater, the second downlink reference signal corresponding to a second path that is between the UE and the base station;

estimating a first uplink path loss of the first path that is between the UE and the base station and passes the repeater based on a measurement of the first downlink reference signal;

estimating a second uplink path loss of the second path that is between the UE and the base station based on a second downlink measurement of the second downlink reference signal;

determining a first uplink transmit power corresponding to the first path that is between the UE and the base station and passes the repeater based on the first uplink path loss;

determining a second uplink transmit power corresponding to the second path that is between the UE and the base station based on the second uplink path loss; and performing an uplink transmission on the first path that is between the UE and the base station and passes the repeater based on the first uplink transmit power and on the second path that is between the UE and the base station based on the second uplink transmit power.

2. The method of claim 1, wherein the first downlink reference signal from the repeater and the second downlink reference signal from the base station correspond to a same set of downlink reference signal resources configured to the UE from the base station.

3. The method of claim 1, further comprising:

transmitting a first uplink reference signal through the first path that is between the UE and the base station and passes the repeater and a second uplink reference signal through the second path that is between the UE and the base station; and receiving a first transmit power control (TPC) command for adjusting transmit power of the first path that is between the UE and the base station and passes the repeater, the first TPC command corresponding to the first uplink reference signal, and a second TPC command corresponding to the second path that is between the UE and the base station, the second TPC command corresponding to the second uplink reference signal, wherein the first uplink transmit power corresponding to the first path that is between the UE and the base station and passes the repeater is determined based on the first uplink path loss and the first TPC command, and the second uplink transmit power corresponding to the second path that is between the UE and the base station is determined based on the second uplink path loss and the second TPC command.

4. The method of claim 3, wherein the first uplink reference signal and the second uplink reference signal are transmitted using a set of uplink reference signal resources corresponding to a set of multiple antenna ports configured to the UE, the uplink reference signal resources for transmitting the first uplink reference signal corresponding to a first set of antenna ports from the set of multiple antenna ports, the uplink reference signal resources for transmitting the second uplink reference signal corresponding to a second set of antenna ports from the set of multiple antenna ports.

5. The method of claim 3, wherein the first uplink reference signal and the second uplink reference signal are transmitted using different sets of uplink reference signal resources configured to the UE.

6. The method of claim 1, wherein the first path consisting of a first-hop path between the repeater and the UE on a first frequency band and a second-hop path between the base-station and the repeater on a second frequency band, and the second path that is between the UE and the base station is on the second frequency band, wherein the second frequency band is different from the first frequency band.

7. The method of claim 1, further comprising:

determining first power headroom information corresponding to the first path that is between the UE and the base station and passes the repeater;

determining second power headroom information corresponding to the second path that is between the UE and the base station; and reporting at least one of the first power headroom information, the second power headroom information, and a power headroom information derived from both the first power headroom information and the second power headroom information, to the base station.

* * * * *